(12) United States Patent
Neufeld et al.

(10) Patent No.: US 9,098,108 B2
(45) Date of Patent: Aug. 4, 2015

(54) SECURITY CAMERA HAVING DUAL COMMUNICATION PORTS

(71) Applicant: Avigilon Corporation, Vancouver (CA)

(72) Inventors: Michael Neufeld, Vancouver (CA); Jeremy Hale, Nanaimo (CA); Sina Afrooze, Vancouver (CA); Danylo Strashenko, Vancouver (CA); Piotr Celler, North Vancouver (CA)

(73) Assignee: Avigilon Corporation, Vancouver (CA)

( * ) Notice: Subject to any disclaimer, the term of this patent is extended or adjusted under 35 U.S.C. 154(b) by 296 days.

(21) Appl. No.: 13/752,264

(22) Filed: Jan. 28, 2013

(65) Prior Publication Data

US 2014/0198208 A1    Jul. 17, 2014

Related U.S. Application Data

(60) Provisional application No. 61/752,896, filed on Jan. 15, 2013.

(51) Int. Cl.
*H04N 7/18* (2006.01)
*H04N 5/225* (2006.01)
*G06F 3/00* (2006.01)

(52) U.S. Cl.
CPC .................................. *G06F 3/005* (2013.01)

(58) Field of Classification Search
CPC ...... G06F 3/005; H04N 5/2254; H04N 5/772; H04N 7/18; H04N 7/185; H04N 5/232; H04N 2201/0084; H04N 2201/225; G08B 13/19617; G08B 13/19621; G08B 13/19632
USPC ................. 348/143, 151, 158, 207.99, 211.1, 348/211.3, 211.14, 222.1, 340; 386/224, 386/226, 230, 231, 278

IPC .......................... H04N 7/18,5/225, 5/228, 5/232
See application file for complete search history.

(56) References Cited

U.S. PATENT DOCUMENTS

2007/0070206 A1*  3/2007  Clark ........................ 348/207.99
2010/0073506 A1*  3/2010  Uehara et al. .............. 348/222.1
(Continued)

FOREIGN PATENT DOCUMENTS

WO    WO 2014/110653 A1    7/2014

OTHER PUBLICATIONS

International Search Report dated Sep. 10, 2013, issued by the Canadian Intellectual Property Office in corresponding International Patent Application No. PCT/CA2013/050059, filed Jan. 28, 2013.
(Continued)

*Primary Examiner* — Sherrie Hsia
(74) *Attorney, Agent, or Firm* — Klarquist Sparkman, LLP

(57) ABSTRACT

The present disclosure is directed at a security camera having dual communication ports. The camera includes a camera body mountable to a mounting surface and comprising an aperture, a lens, an imager, primary communication circuitry comprising a primary communication port accessible from outside the camera body, secondary communication circuitry comprising a secondary communication port accessible from outside the camera body, and control and processing circuitry communicatively coupled to the imager and to the primary and secondary communication circuitry. The primary communication port is on one side of the mounting when the camera body is mounted and the secondary communication port and the aperture are on an opposing side of the mounting surface when the camera body is mounted. A digital communication signal is sent to the secondary communication port when the secondary communication port is coupled to an active link.

58 Claims, 8 Drawing Sheets

(56) References Cited

U.S. PATENT DOCUMENTS

| | | |
|---|---|---|
| 2010/0111489 A1 | 5/2010 | Presler |
| 2010/0289904 A1 | 11/2010 | Zhang et al. |
| 2011/0195789 A1 | 8/2011 | Wells |
| 2013/0002883 A1 | 1/2013 | Creamer et al. |

OTHER PUBLICATIONS

Written Opinion dated Sep. 11, 2013, issued by the Canadian Intellectual Property Office in corresponding International Patent Application No. PCT/CA2013/050059, filed Jan. 28, 2013.

* cited by examiner

SECURITY CAMERA HAVING DUAL COMMUNICATION PORTS

CROSS REFERENCE TO RELATED APPLICATION

Pursuant to 35 U.S.C. §119(e), this application claims the benefit of provisional U.S. Patent Application No. 61/752,896, filed Jan. 15, 2013 and entitled "Security Camera Having Dual Communication Ports," which is hereby incorporated by reference.

TECHNICAL FIELD

The present disclosure is directed at a security camera having dual communication ports.

BACKGROUND

The security industry, and in particular the market for internet protocol (IP) security cameras, continues to grow. This is, at least in part, due to the advantages that IP security cameras enjoy over conventional, analog security cameras. For example, IP cameras permit two-way communication, allow for higher resolution than analog cameras, and can easily be relocated on an IP network. Given their increasing popularity, research and development continue into making IP security cameras easier to install and use.

SUMMARY

According to a first aspect, there is provided a security camera having dual communication ports. The camera comprises a camera body mountable to a mounting surface and comprising an aperture to permit light to enter the camera body; a lens mounted to the camera body and positioned to refract the light entering the camera body through the aperture; an imager located within the camera body and positioned to receive the light refracted by the lens; primary communication circuitry comprising a primary communication port accessible from outside the camera body, wherein the primary communication port is on one side of the mounting surface when the camera body is mounted; secondary communication circuitry comprising a secondary communication port accessible from outside the camera body, wherein the secondary communication port and one or both of the lens and the aperture are on an opposing side of the mounting surface when the camera body is mounted; and control and processing circuitry communicatively coupled to the imager and to the primary and secondary communication circuitry, the control and processing circuitry comprising a processor and a computer readable medium, communicatively coupled to the processor, having encoded thereon statements and instructions to cause the processor to send a digital communication signal derived from the light incident on the imager to the secondary communication port when the secondary communication port is coupled to an active link.

According to another aspect, there is provided a security camera having dual communication ports. The camera comprises a camera body comprising an aperture to permit light to enter the camera body; a lens mounted to the camera body and positioned to refract the light entering the camera body through the aperture; an imager located within the camera body and positioned to receive the light refracted by the lens; an attachment assembly attached to the camera body and mountable to a mounting surface; primary communication circuitry comprising a primary communication port accessible through the attachment assembly; secondary communication circuitry comprising a secondary communication port accessible through the camera body; and control and processing circuitry communicatively coupled to the imager and to the primary and secondary communication circuitry, the control and processing circuitry comprising a processor and a computer readable medium, communicatively coupled to the processor, having encoded thereon statements and instructions to cause the processor to send a digital communication signal derived from the light incident on the imager to the secondary communication port when the secondary communication port is coupled to an active link. The attachment assembly may comprise a mounting arm affixed to an attachment plate, and the attachment plate may comprise an access port through which the primary communication port is accessible. The access port may be positioned on a surface of the attachment plate adjacent to the mounting surface when the camera is mounted.

According to another aspect, there is provided a security camera having dual communication ports that comprises a camera body mountable to a mounting surface and comprising an aperture to permit light to enter the camera body; a lens mounted to the camera body and positioned to refract the light entering the camera body through the aperture; an imager located within the camera body and positioned to receive the light refracted by the lens; primary communication circuitry comprising a primary communication port accessible from outside the camera body, wherein the primary communication port is behind the mounting surface when the camera body is mounted; secondary communication circuitry comprising a secondary communication port accessible from outside the camera body, wherein the secondary communication is in front of the mounting surface when the camera body is mounted; and control and processing circuitry communicatively coupled to the imager and to the primary and secondary communication circuitry, the control and processing circuitry comprising a processor and a computer readable medium, communicatively coupled to the processor, having encoded thereon statements and instructions to cause the processor to send a digital communication signal derived from the light incident on the imager to the secondary communication port when the secondary communication port is coupled to an active link.

The following describes potential variations to all of the foregoing aspects.

The digital communication signal may be simultaneously sent to both the primary and secondary communication ports.

Alternatively, the digital communication signal may be separately sent to the primary communication port or to the secondary communication port.

The statements and instructions may further cause the processor to detect whether the secondary communication port is coupled to the active link, and to send the digital communication signal to the secondary communication port only when the secondary communication port is coupled to the active link.

Detecting whether the secondary communication port is coupled to the active link may comprise polling the secondary communication port.

The statements and instructions may further cause the processor, when the secondary communication port is not coupled to the active link, to send the digital communication signal to the primary communication port.

The secondary communication port may be located on an underside of the camera body.

The digital communication signal may be communicated using Ethernet.

The control and processing circuitry may further comprise a media access controller (MAC) and input/output control circuitry, each of which is communicatively coupled to the processor and to the primary and secondary communication circuitry.

The primary communication circuitry may comprise a primary PHY communicatively coupled to the primary communication port and to the MAC and the secondary communication circuitry may comprise a secondary PHY communicatively coupled to the secondary communication port and to the MAC.

The primary and secondary PHYs may be communicatively coupled to the MAC through a shared media-independent interface (MII bus) and a shared management data input/out interface (MDIO bus) of the MAC.

The primary and secondary PHYs may be pin strapped to commence operation by setting their outputs that are connected to the MII bus to a high impedance state.

The input/output circuitry may comprise a primary reset line communicatively coupled to a reset input of the first PHY, a secondary reset line communicatively coupled to a reset input of the second PHY, and an address line communicatively coupled to an MDIO address select input on the first and second PHYs.

The statements and instructions may further cause the processor, prior to detecting that the secondary communication port is coupled to the active link, to send the digital communication signal to the primary communication port via the primary PHY and to set outputs of the secondary PHY connected to the MII bus to a high impedance state, and following detecting that the secondary communication port is coupled to the active link: to stop the primary PHY; to notify the application layer that there is no active link prior to activating the secondary PHY; to set outputs of the primary PHY connected to the MII bus to a high impedance state; to take the outputs of the secondary PHY connected to the MII bus out of a high impedance state; to activate the secondary PHY; and to notify the application layer that the active link is present.

The camera may be a bullet camera.

According to another aspect, there is provided a method for switching between primary and secondary communication ports of a security camera comprising a camera body mountable to a mounting surface, an aperture in the camera body to permit light to enter the camera body, a lens mounted to the camera body and positioned to refract the light entering the camera body through the aperture, and an imager located within the camera body and positioned to receive the light refracted by the lens, wherein the primary communication port is on one side of the mounting surface when the camera body is mounted and the secondary communication port and one or both of the lens and aperture are on an opposing side of the mounting surface when the camera body is mounted. The method comprising sending a digital communication signal comprising a video signal derived from the light incident on the imager to the secondary communication port when the secondary communication port is coupled to an active link.

The digital communication signal may be simultaneously sent to both the primary and secondary communication ports. Alternatively, the digital communication signal may be separately sent to the primary communication port or to the secondary communication port.

The method may further comprise detecting whether the secondary communication port is coupled to the active link, and sending the digital communication signal to the secondary communication port only when the secondary communication port is coupled to the active link.

Detecting whether the secondary communication port is coupled to the active link may comprise polling the secondary communication port.

The method may further comprise when the secondary communication port is not coupled to the active link, sending the digital communication signal to the primary communication port.

The secondary communication port may be located on an underside of the camera body.

The digital communication signal may be communicated using Ethernet.

The camera may further comprise a media-independent interface (MII) bus and a primary PHY and a secondary PHY, each of which has outputs connected to the MII bus and via which the digital communication signal is sent to the primary and secondary communication ports, and the method may further comprise: prior to detecting that the secondary communication port is coupled to the active link, sending the digital communication signal to the primary communication port via the primary PHY and setting the outputs of the secondary PHY connected to the MII bus to a high impedance state; and following detecting that the secondary communication port is coupled to the active link: stopping the primary PHY; notifying the application layer that there is no active link prior to activating the secondary PHY; setting outputs of the primary PHY connected to the MII bus to a high impedance state; taking the outputs of the secondary PHY connected to the MII bus out of a high impedance state; activating the secondary PHY; and notifying the application layer that the active link is present.

The camera may be a bullet camera.

According to another aspect, there is provided a non-transitory computer readable medium having encoded thereon statements and instructions to cause a processor to perform any of the foregoing aspects of methods or combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

During conventional installation of an IP security camera, an installation technician connects the camera to a network via which the camera will transmit a digital communication signal, which includes digital video information used to generate a video and control information. The connection between the camera and the network ("network connection") is behind the surface to which the camera is mounted ("mounting surface"); for example, if the mounting surface is a wall, the network connection is made behind the wall. The location of the network connection means that once the camera is in place and secured to the mounting surface the technician can no longer physically access the network connection.

Once the camera has been mounted, the installation process involves the technician viewing the video generated from the digital communication signal that the camera outputs to the network to properly focus and aim the camera. Because the network connection is inaccessible to the technician, however, the technician either directly views the video from a video terminal connected to the network and remote from the camera or works with a partner who is at the video terminal and relays information to the technician. Neither solution is optimal: in the former case, time is wasted as the technician travels between the camera and the video terminal while in the latter case labor costs are higher than if the technician works alone.

The embodiments disclosed herein are directed at a security camera that has dual communication ports, which are used to output the digital communication signal. One of the communication ports ("primary communication port") is positioned to be behind the mounting surface when the camera is installed, while the other ("secondary communication port") is positioned to be in front of the mounting surface and accessible to the technician even after the camera has been mounted. When the technician connects a video terminal to the secondary communication port, the camera outputs the digital communication signal to the technician's video terminal to allow the technician to view the video and to focus and aim the camera while working alone and without having to leave the camera, thereby facilitating installation of the camera.

Figure 1:
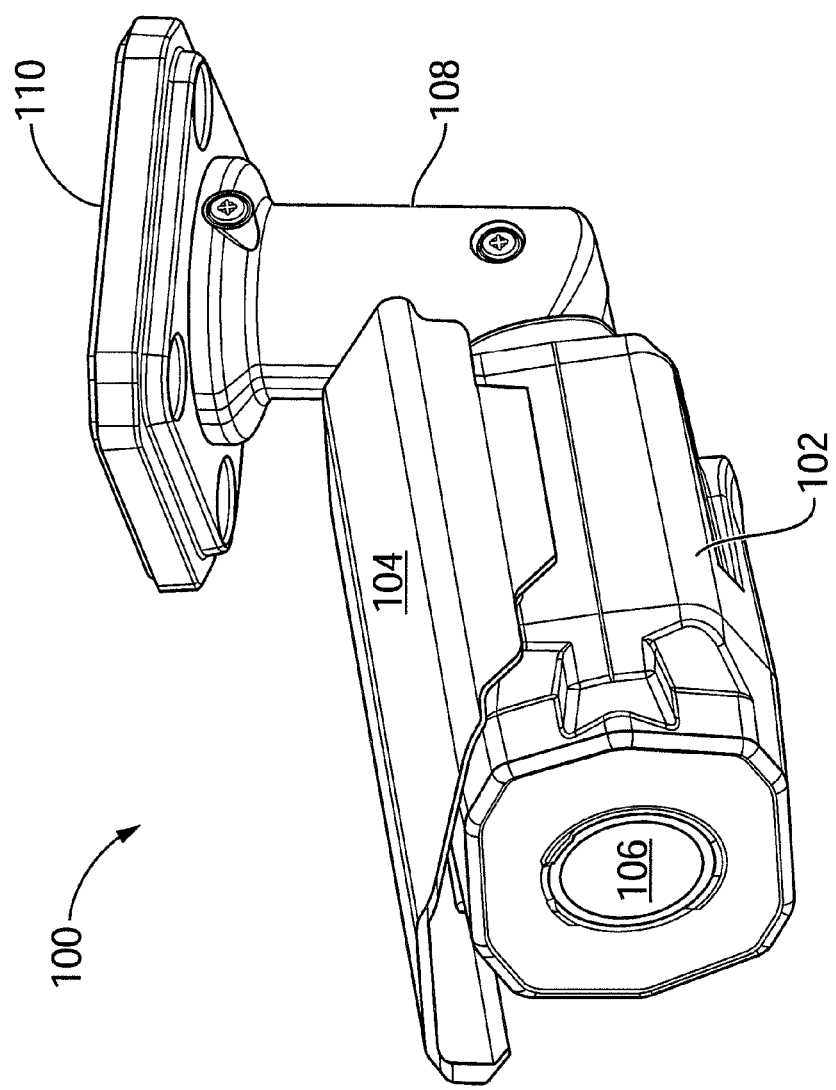
FIG. 1 is a perspective view of a security camera having dual communication ports, according to one embodiment.
Figure 2:
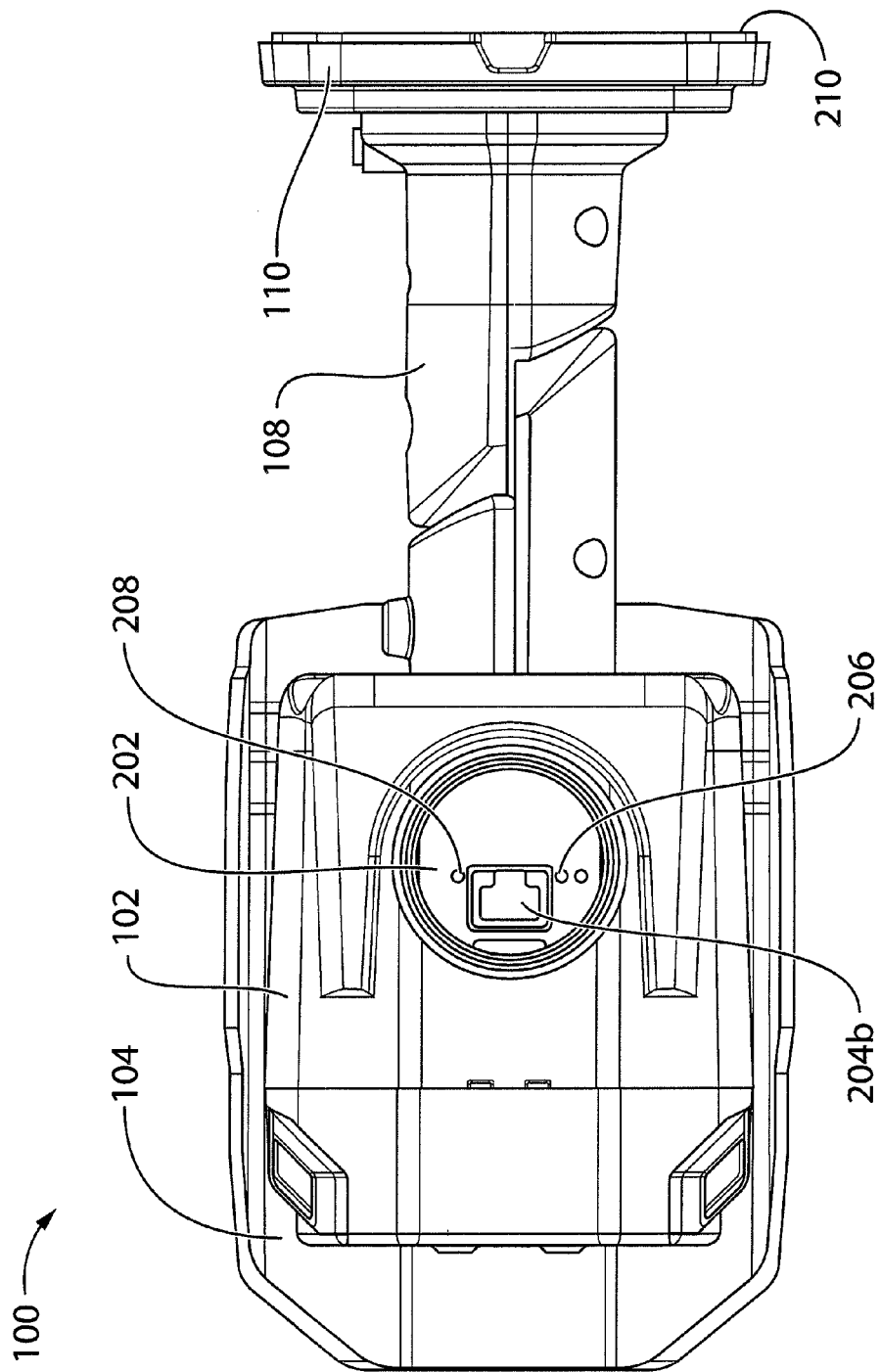
FIG. 2 is a bottom plan view of the camera of FIG. 1.

Referring now to FIGS. 1 and 2, there are respectively shown a perspective view and a bottom plan view of a security camera 100 having dual communications ports, a mounting arm 108, and an attachment plate 110, according to one embodiment. The mounting arm 108 and attachment plate 110 are collectively the "attachment assembly" of the camera. The camera 100 includes and is housed within a camera body 102 that has an aperture 106 to permit light to enter the camera body 102. A lens (not shown) is mounted to the camera body 102 and is positioned to refract the light entering the camera body 102 through the aperture 106. In the depicted embodiment, the lens is contained within the camera body 102; however, in alternative embodiments (not depicted), the lens may be mounted to the exterior of the camera body 102. Attached to the left and right sides of the camera body 102 and extending along the top of the camera body 102 is a hood 104 that overhangs the front of the camera body 102. The rear of the camera body 102 is attached to the mounting arm 108, which connects the camera body 102 to the attachment plate 110 that is affixed to the mounting surface.

On the underside of the camera body 102 is a configuration panel 202 that has on it a secondary communication port in the form of a configuration Ethernet port 204b, a connection status LED 206, and a link LED 208, which are discussed in more detail below. On the attachment plate 110 are a serial number tag 210 that identifies the camera 100 and an access port (not shown) on the surface of the attachment plate 110 that is adjacent the mounting surface when the camera 100 is mounted. A primary communication port in the form of a primary Ethernet port 204a (shown in FIG. 3) is accessible through the access port and is connected to the network during camera installation. The Ethernet port 204a is on one side of the mounting surface when the camera body 102 is mounted (e.g.: behind a wall) whereas the configuration Ethernet port 204b and the lens are on an opposing side of the mounting surface when the camera body 102 is mounted (e.g.: in front of the wall). The configuration Ethernet port 204b is consequently easily accessible by the technician even after the camera 100 has been mounted to the mounting surface, whereas the access port is not.

Figure 3:
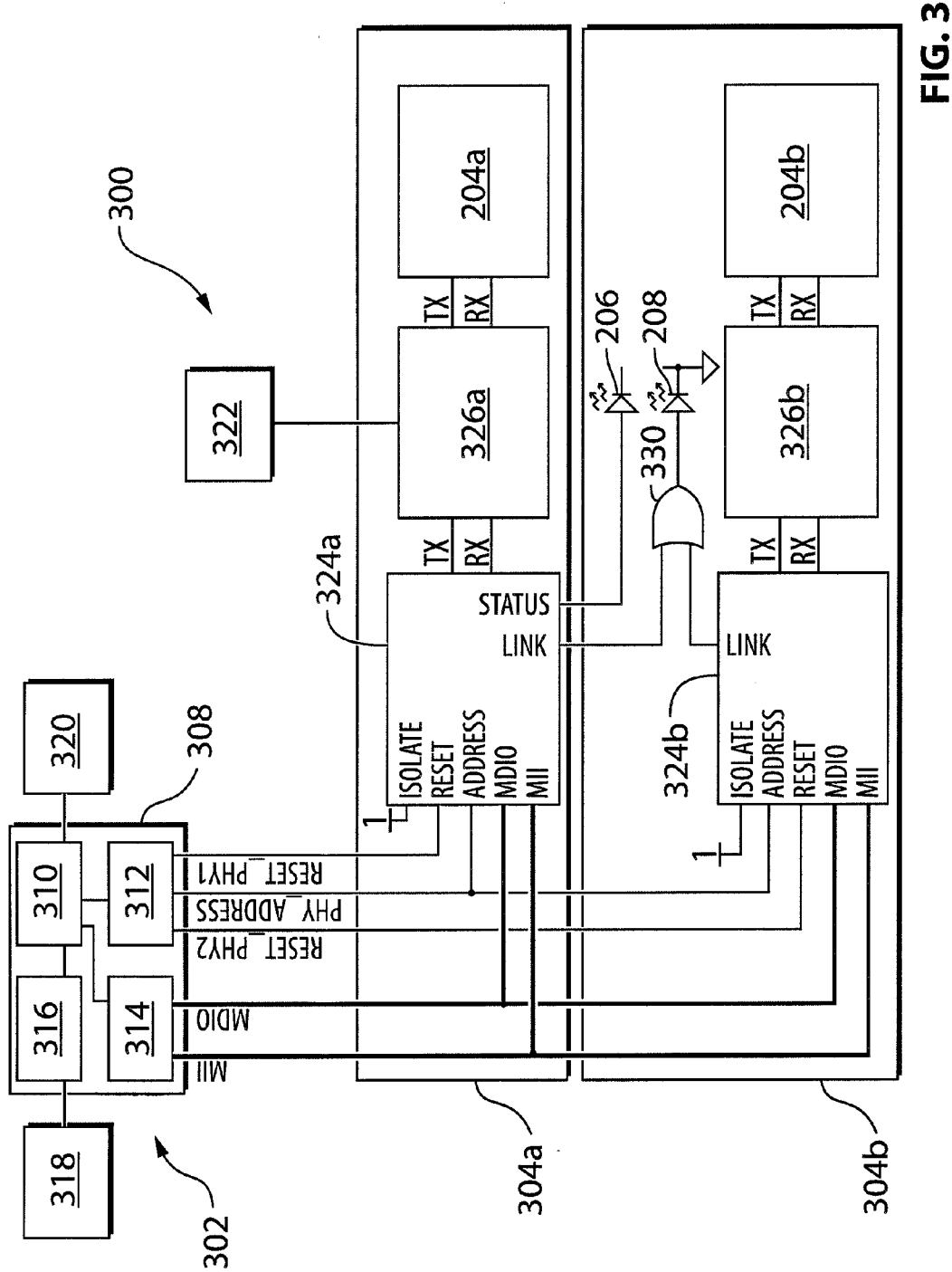
FIG. 3 is a block diagram of an imager, control and processing circuitry, and communication circuitry used in the camera of FIG. 1.

Referring now to FIG. 3, there is shown a block diagram 300 of an imager 318, control and processing circuitry 302, and communication circuitry 304a,304b housed within the camera body 102. The imager 318 is positioned to receive the light refracted by the lens and to output a signal to the control and processing circuitry 302, which in FIG. 3 is a system on chip (SoC) 308 and a computer readable medium 320 such as non-volatile memory storing statements and instructions for the SoC 308 to perform. Exemplary statements and instructions include a method 400 for switching between the ports 204a,b of the camera 100 as shown in FIG. 4 and discussed in more detail below. The SoC 308 includes a processor 310 that is communicatively coupled to each of the other components of the SoC 308: an image signal processor (ISP) 316, a media access controller (MAC) 314, and input/output control circuitry in the form of general purpose input/output (GPIO) lines 312. The processor 310 is also communicatively coupled to the computer readable medium 320.

Two buses are connected to the MAC 314: a media independent interface (MII) bus and a management data input/output (MDIO) bus. These two buses are used by the MAC 314 to communicate with, and are shared by, the primary and secondary communication circuitry 304a,304b. The primary communication circuitry 304a includes a primary Ethernet physical layer IC (an Ethernet physical layer IC is hereinafter referred to as a "PHY") 324a that is communicatively coupled using transmit and receive lines to the primary Ethernet port 204a via Ethernet magnetics 326a. Electrically coupled to the Ethernet magnetics 326a is a DC to DC converter 322 that receives power from the network when the camera is connected to the network via the primary Ethernet port 204a; this power is used to power the camera 100 using power over Ethernet (PoE) technology. The primary PHY 324a is connected to the MAC 314 via the MDIO and MII buses. Similarly, the secondary communication circuitry 304b includes a secondary PHY 324b that is communicatively coupled using transmit and receive lines to the configuration Ethernet port 204b via Ethernet magnetics 326b. The secondary PHY 324b is also connected to the MAC 314 via the MDIO and MII buses. In the depicted embodiment, each of the Ethernet ports 204a,b is an RJ-45 connector and each of the PHYs 324a,b is a Broadcom™ BCM5421 10/100BaseT (Fast) Ethernet physical layer IC.

One of the GPIO lines 312, labeled RESET_PHY1 in FIG. 3, is connected to a reset pin on the primary PHY 324a while another of the GPIO lines 312, labeled RESET_PHY2 in FIG. 3, is connected to a reset pin on the secondary PHY 324b. The SoC 308 is accordingly able to independently reset each of the PHYs 324a,b. Another of the GPIO lines 312, labeled PHY_ADDRESS in FIG. 3, is connected to an MDIO address select pin on each of the PHYs 324a,b. By controlling the PHY_ADDRESS line while de-asserting the reset signal for a particular one of the PHYs 324a,b the SoC 308 can assign a separate MDIO address to each of the PHYs 324a,b, which is done to allow both of the PHYs 324a,b to communicate on the shared MDIO bus. This procedure is performed during system initialization.

Each of the PHYs 324a,b also has an isolate pin that is pin strapped high. The PHYs 324a,b consequently boot up in "super isolated" mode in which each of the PHYs 324a,b ignores any input it receives from the Ethernet ports 204a,b and their outputs that are connected to the MII bus are set to a high impedance state. The SoC 308 can use the MDIO bus to configure the PHYs 324a,b to transition to "isolated" mode in which the PHYs 324a,b are able to detect whether the ports 204a,b are coupled to an active link but its outputs that are connected to the MII bus are still set to a high impedance state, and to exit isolated mode and enter an active mode in which the PHYs 324a,b are able to transmit data over the MII bus. In the depicted embodiment in which Ethernet is used to communicate, being coupled to an active link refers to the PHYs 324a,b being coupled to an active Ethernet connection via the ports 204a,b. More generally, being coupled to an active link refers to the primary and secondary communication circuitry being coupled, via the primary and secondary communication ports, respectively, to an active connection that communicates using a protocol that the primary and secondary communication circuitry is designed to use.

Each of the PHYs 324a,b has a "link" pin that is low when the PHYs 324a,b do not detect an active link and high when they do. The link pins from the PHYs 324a,b are logically ORed together with the result output to the link LED 208; the link LED 208 accordingly indicates whether either of the PHYs 324a,b is coupled to an active link. The primary PHY 324a also has a "status" pin that the SoC 308 controls via the MDIO bus. The status pin is connected to the status LED 206, which accordingly shows the status as determined by the SoC 308.

Figure 4A:
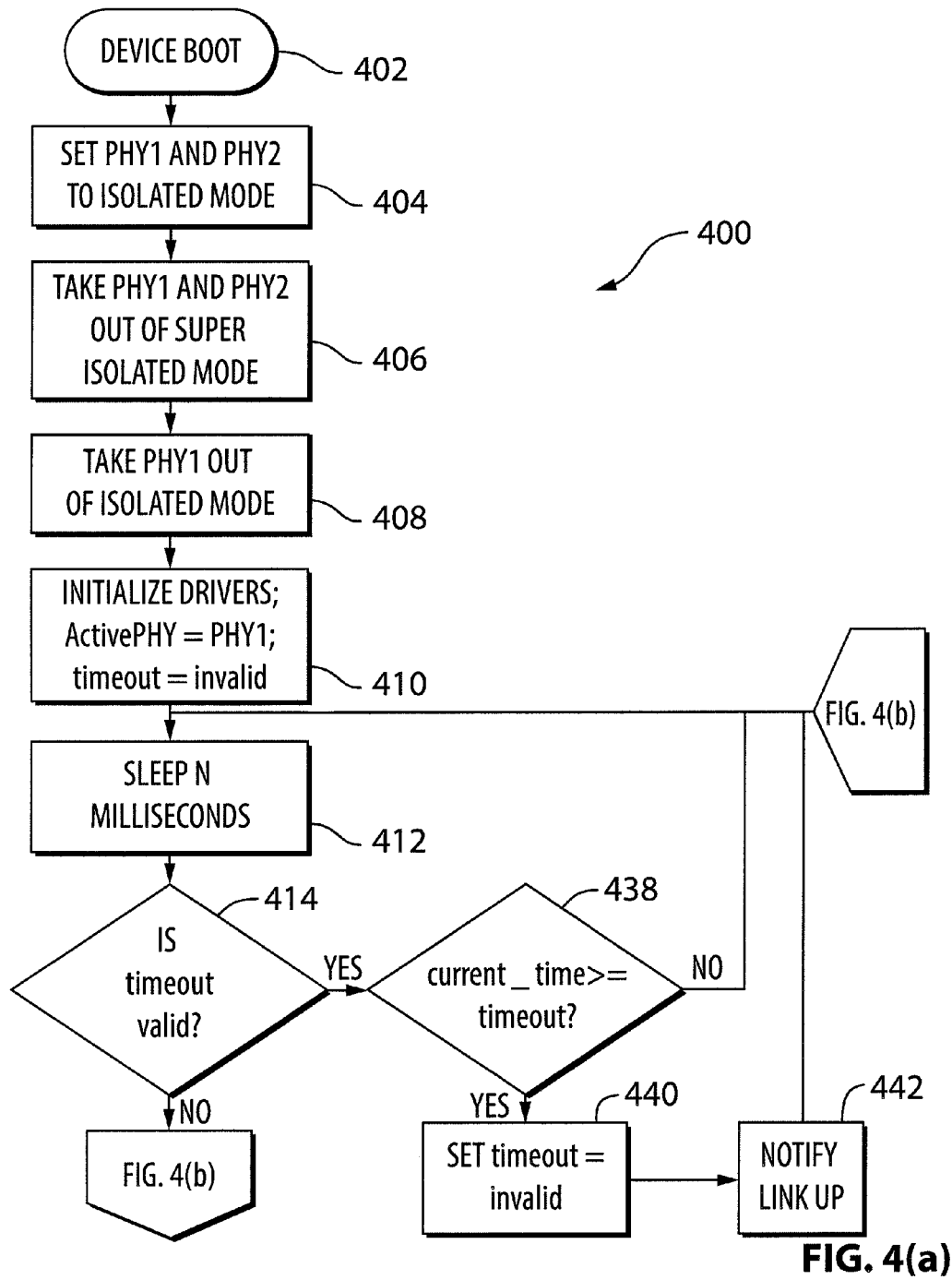
FIGS. 4(a) and (b) are a flowchart of a method for switching between the dual communication ports of the camera of FIG. 1, according to another embodiment.
Figure 4B:
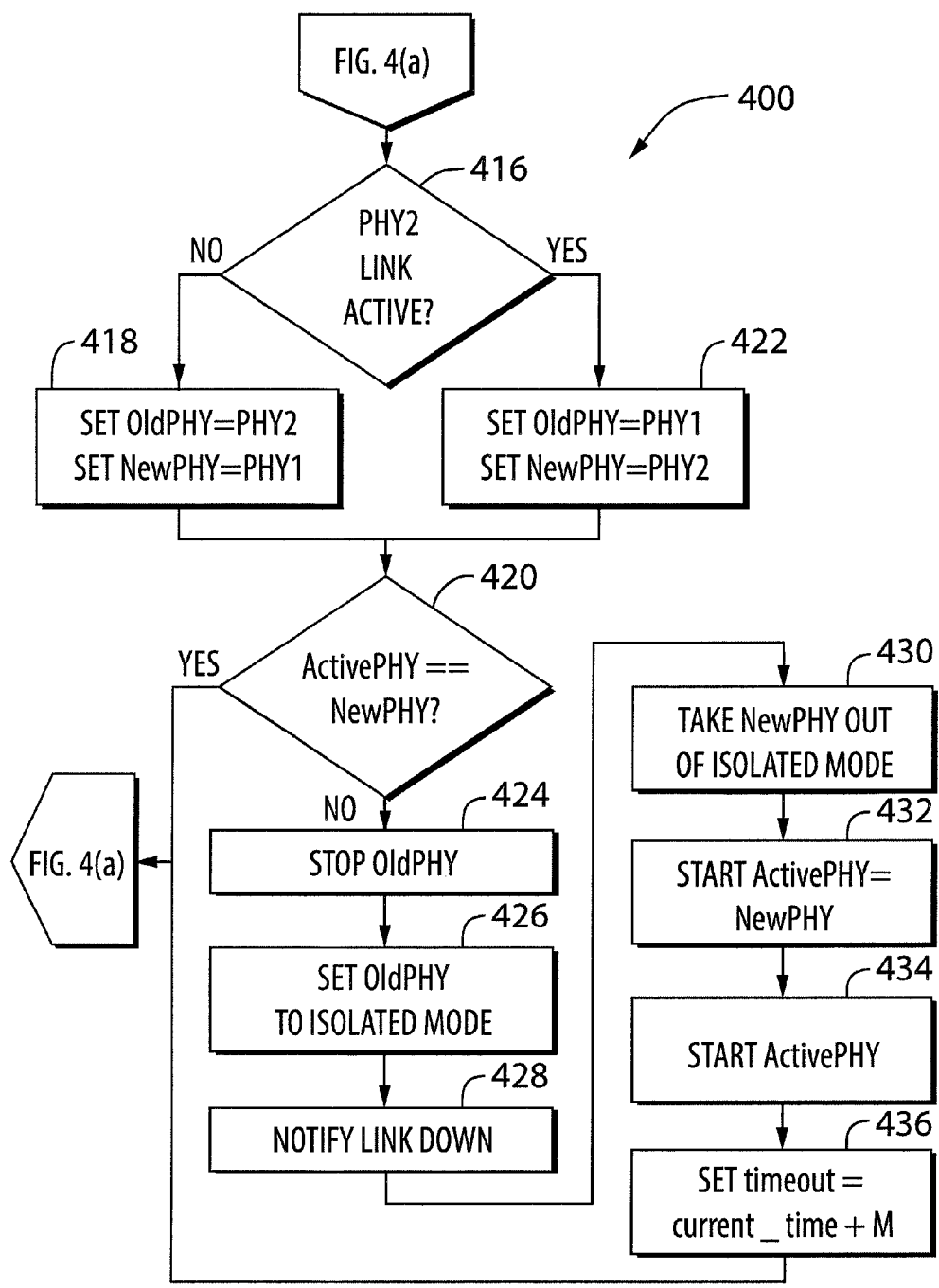

Referring now to FIGS. 4(a) and (b), there is shown a flowchart of the method 400 for switching between the dual communication ports 204a,b of the camera 100. The SoC 308 monitors the configuration Ethernet port 204b to detect when it is coupled to an active link. When it is coupled to an active link, such as when the technician connects a video terminal to it to focus and aim the camera 100 during installation, the SoC 308 then sends the digital communication signal, which includes the digital video information derived from the light incident on the imager 318, to the configuration Ethernet port 204b. If the SoC 308 was previously sending the digital communication signal to the primary Ethernet port 204a, in the depicted embodiment the SoC 308 ceases sending the digital communication signal to the primary Ethernet port 204a before sending the signal to the configuration Ethernet port 204b. In FIGS. 4(a) and (b), the primary PHY 324a is referred to as PHY1 and the secondary PHY 324b is referred to as PHY2.

At block 402, the camera 100 boots up. As discussed above, the PHYs 324a,b are pin strapped to boot up in super isolated mode. At block 404, the SoC 308 sets both of the PHYs 324a,b to isolated mode by issuing a command over the MDIO bus. At block 406, the SoC 308 takes both of the PHYs 324a,b out of super isolated mode. While in the depicted embodiment the PHYs 324a,b boot up in super isolated mode, in alternative embodiments (not depicted) the PHYs 324a,b may boot up in isolated mode. The SoC 308 then takes the primary PHY 324a out of isolated mode at block 408, which is tantamount to setting the primary PHY 324a to active mode. The SoC 308 then initializes drivers and sets the variable ActivePHY, which the SoC 308 uses to store which of the PHYs 324a,b is currently in active mode, to the primary PHY 324a at block 410. The SoC 308 also initializes a variable, timeout, to invalid. As discussed in more detail below the timeout variable is used to determine when to send messages from the physical layer to the application layer. Blocks 404 to 410 represent the initialization phase of the method 400.

At block 412 the SoC 308 sleeps for N ms, which in the depicted embodiment is 500 ms. At block 414 the SoC 308 determines whether timeout is valid. The first time the SoC 308 performs the method 400 timeout is invalid, and the SoC 308 proceeds to block 416 where it determines whether the configuration Ethernet port 204b is coupled to an active link, which the SoC 308 can monitor via the MDIO bus. If no, then the SoC 308 determines that the technician has not connected a video terminal to the configuration Ethernet port 204b, and the SoC 308 proceeds to block 418 where it sets a variable OldPHY to represent the secondary PHY 324b and sets a variable NewPHY to represent the primary PHY 324a. The SoC 308 then proceeds to block 420 where it determines whether the PHY 324a,b represented by NewPHY is the ActivePHY. In this case, as NewPHY and ActivePHY are both the primary PHY 324a, the answer is yes and the SoC 308 returns to block 412 where it loops through blocks 412 to 420 until the technician couples the configuration Ethernet port 204b to an active link.

Once the technician couples the configuration Ethernet port 204b to an active link, such as by connecting the configuration Ethernet port 204b to a laptop with software used to interface with the camera 100 via an Ethernet cable, the secondary PHY 324b detects the active link and reports this to the SoC 308 via the MDIO bus. The next time the SoC 308 arrives at block 416 it detects the active link and proceeds to block 422 where OldPHY is set to the primary PHY 324a and NewPHY is set to the secondary PHY 324b. At block 420, the SoC 308 determines that ActivePHY is not NewPHY, and consequently proceeds to block 424 where it stops OldPHY (the primary PHY 324a) and sets it to isolated mode via the MDIO bus (block 426). The SoC 308 notifies the application layer that the Ethernet link is down at block 428. The application software running on the camera 100 accordingly believes that the Ethernet connection has been lost and can react accordingly as the physical layer transitions from the primary PHY 324a to the secondary PHY 324b. At block 430 the SoC 308 takes NewPHY (the secondary PHY 324b) out of isolated mode, then sets ActivePHY to represent the secondary PHY 324b (block 432), and then starts using the secondary PHY 324b (block 434). The SoC 308 then proceeds to block 436 where it sets timeout to a valid value of the current time+M, where in the depicted embodiment M is 2,000 ms. After setting timeout the SoC 308 returns to block 412.

In the depicted embodiment where N=500 ms and M=2, 000 ms, the SoC 308 then loops through blocks 412, 414, and 438 three times until on the fourth time, the SoC 308 at block 438 determines that the current time equals timeout and proceeds to block 440 where it resets timeout to invalid instead of proceeding directly back to block 412. After block 440 the SoC 308 proceeds to block 442 where it notifies the application layer that the active link has returned, and then proceeds back to block 412. This effectively causes the physical layer to simulate to the application layer that the active link returns after having been lost for 2,000 ms, thereby allowing the application layer to handle the transition from the primary PHY 324a to the secondary PHY 324b with legacy programming designed for use only with the primary PHY 324a. The application layer is able to function without knowledge of the dual ports 204a,b and without knowledge that what it perceives as a loss and return of the active link on one port is actually a transition from the primary PHY 324a to the secondary PHY 324b. In alternative embodiments (not shown), however, the application layer may be programmed with knowledge that the camera 100 has two ports 204a,b, and may be able to handle the transition between the two ports 204a,b without the physical layer simulating a lost link as described above.

After returning to block 412, the SoC 308 loops between blocks 412 and 420 until the technician removes the active link from the configuration Ethernet port 204b by, for example, unplugging the Ethernet cable from the configuration Ethernet port 324b.

After the active link is removed, the secondary PHY 324b detects the termination of the active link and reports this to the SoC 308 via the MDIO bus. The next time the SoC 308 arrives at block 416 it detects the lack of an active link and proceeds to block 418 where OldPHY is set to the secondary PHY 324b and NewPHY is set to the primary PHY 324a. At block 420, the SoC 308 determines that ActivePHY is not NewPHY, and consequently proceeds to block 424 where it stops OldPHY (the secondary PHY 324b) and sets it to isolated mode (block 426). The SoC 308 notifies the application layer that the Ethernet link is down at block 428. The application software running on the camera 100 accordingly believes that the Ethernet connection has been lost again and can react accordingly as the physical layer transitions from the secondary PHY 324b to the primary PHY 324a. At block 430 the SoC 308 takes NewPHY (the primary PHY 324a) out of isolated mode, then sets ActivePHY to represent the primary PHY 324a (block 432), and then starts using the primary PHY 324a (block 434). The SoC 308 then proceeds to block 436 where it sets timeout to a valid value of the current time+M, where in the depicted embodiment M is 2,000 ms. After setting timeout the SoC 308 returns to block 412 where the SoC 308 will wait for 2,000 ms before it notifies the application layer that the active link has returned. The SoC 308 then returns to block 412 where it loops between blocks 412 and 420 until the configuration Ethernet port 204b is used again.

While in the foregoing embodiments the primary Ethernet port 204a is coupled to an active link before, during, and after the configuration Ethernet port 204b is coupled to an active link, in alternative embodiments this need not be the case. For example, the technician may use the configuration Ethernet port 204b prior to connecting the primary Ethernet port 204a to the network, or the network may be offline while the configuration Ethernet port 204b is being used.

Figure 5A:
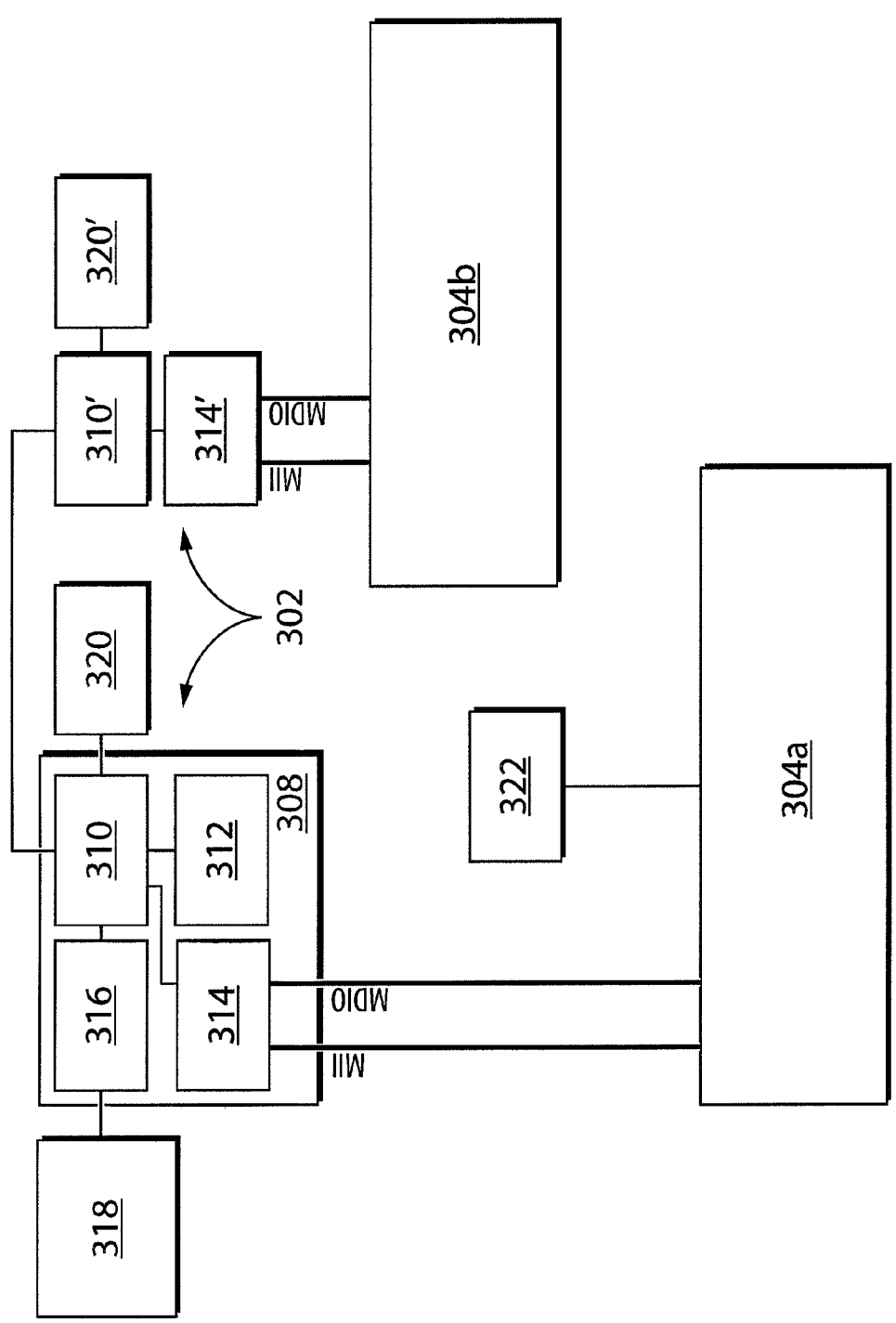
FIGS. 5(a) to (c) are block diagrams of alternative embodiments of the imager, control and processing circuitry, and communication circuitry of FIG. 3.

Additionally, in the foregoing embodiments the PHYs 324a,b share the MII and MDIO buses and are thereby coupled to the same MAC 314. However, in alternative embodiments this need not be the case. For example, in one of these alternative embodiments depicted in FIG. 5(a), the control and processing circuitry 302 is as shown in FIG. 3 except it also includes an additional processor 310', an additional MAC 314' communicatively coupled to the processor 310', and an additional computer readable medium 320'communicatively coupled to the processor 310'. The additional processor 310' is connected to the processor 310 shown in FIG. 3. Instead of the communication circuitry 304a,b sharing the same MAC 314, the primary PHY 324a (not expressly shown in FIG. 5(a), but part of the primary communication circuitry 304a) is coupled to the MII and MDIO buses of one of the MACs 314 while the secondary PHY 324b (not expressly shown in FIG. 5(a), but part of the secondary communication circuitry 304b) is coupled to the MII and MDIO buses of the other MAC 314'. The PHYs 324a,b are reset in conjunction with a system-wide reset as opposed to individually by the processors 310,310'. Because the PHYs 324a,b do not share MDIO or MII buses the address pins of the PHYs 324a,b are unused. As in FIG. 3, the imager 318 is connected to the ISP 316, which communicates with one of the processors 310 and the DC to DC converter 322 is connected to the primary communication circuitry 304a to power the camera 100. The two processors 310,310' communicate with each other to send the digital communication signal to one or both of the ports 204a,b at any given time.

Figure 5B:
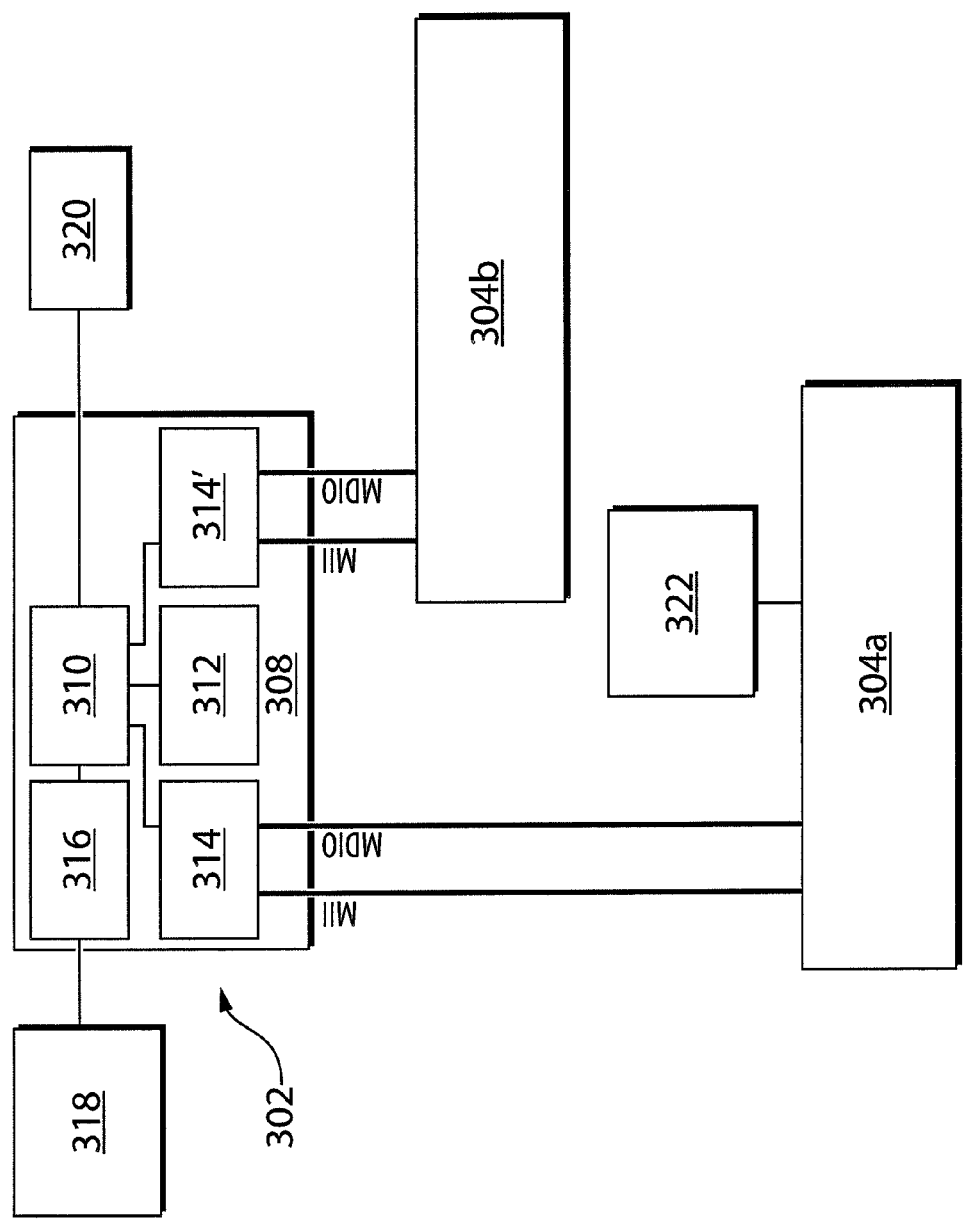

In another of these alternative embodiments, the control and processing circuitry 302 has two MACs 314,314' but these are either incorporated into the SoC 308 or, if not part of the SoC 308 are nonetheless controlled by the same processor 310. FIG. 5(b) shows an embodiment in which the two MACs 314,314' are integrated into the SoC 308; the control and processing circuitry 302 is otherwise the same as that shown in FIG. 3. As in the embodiment of FIG. 5(a), each of the PHYs 324a is connected to one of the MACs 314,314' via the MDIO bus and MII bus of that MAC 314,314'. The PHYs 324a,b are reset in conjunction with a system-wide reset as opposed to individually by the GPIO lines 312. Also as in FIG. 5(a), because each of the PHYs 324a,b is connected to its own MAC 314,314', the address pins of the PHYs 324a,b are left unused. As in FIGS. 3 and 5(a) the DC to DC converter 322 is connected to the primary communication circuitry 304a to power the camera 100.

Figure 5C:
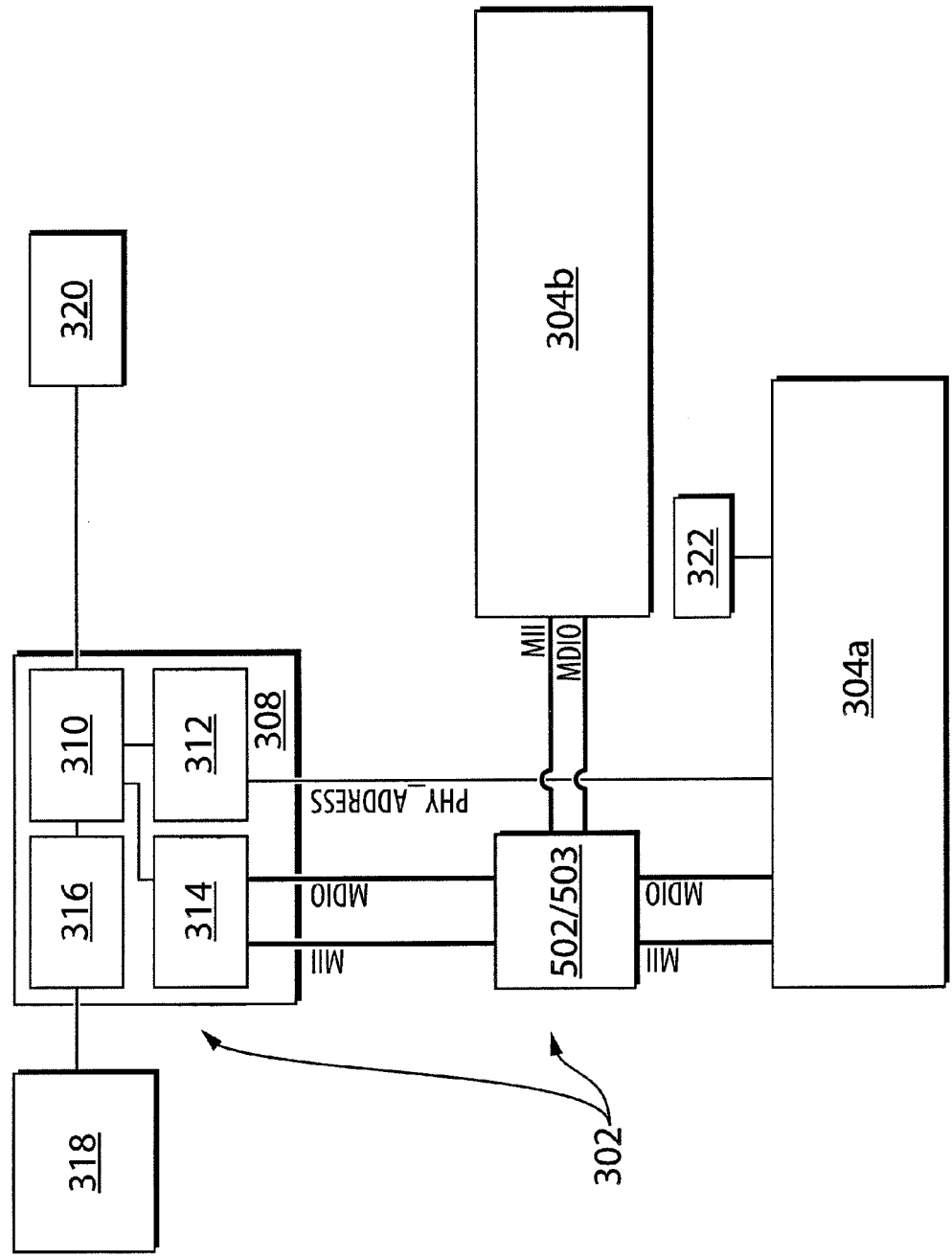

In another of these alternative embodiments depicted in FIG. 5(c), the control and processing circuitry 302 includes a hub 502 or switch 503 interposed between the MAC 314 and the PHYs 324a,b. Additionally, the PHYs 324a,b are reset in conjunction with a system-wide reset as opposed to individually by the GIPO lines 312. The control and processing circuitry 302 is otherwise identical to that shown in FIG. 3, and the PHYs 324a,b are connected to the same MAC 314 via the hub 502 or switch 503. When the hub 502 is used, the hub 502 duplicates all packets sent from the MAC 314 to the PHYs 324a,b so each of the PHYs 324a,b receives the same digital communication signal from the SoC 308. The hub 502 analogously serializes all packets sent from either of the PHYs 324a,b to the MAC 314. The hub 502 may be implemented using, for example, an FPGA or as an integrated circuit. Instead of duplicating all packets sent from the MAC 314 to the PHYs 324a,b, when the switch 503 is used the packets from the MAC 314 destined for the primary Ethernet port 204a are transmitted only to the primary PHY 324a while packets destined for the secondary Ethernet port 204b are transmitted only to the secondary PHY 324b. In the alternative embodiments that incorporate the switch 503 or hub 502, the SoC 308 does not notify the application layer that the link is up or down (blocks 442 and 428) as the SoC 308 is in continuous communication with the switch or hub. As in FIGS. 3, 5(a), and 5(b) the DC to DC converter 322 is connected to the primary communication circuitry 304a to power the camera 100.

Also, in the foregoing embodiments the SoC 308 detects whether the configuration Ethernet port 204b is coupled to the active link, and sends the digital communication signal only to the configuration Ethernet port 204b and only when the configuration Ethernet port 204b is coupled to the active link. In alternative embodiments (not shown) this need not be the case. For example, the SoC 308 may simultaneously send the digital communication signal to both ports 204a,b at all times, as described in the embodiment above using the hub, or only when the configuration Ethernet port 204b is coupled to the active link. Alternatively, the SoC 308 may always send the digital communication signal to the configuration Ethernet port 204b regardless of whether the configuration Ethernet port 204b is coupled to the active link. Alternatively, in the depicted embodiments and in the alternative embodiment described above incorporating the switch, the digital communication signal may be separately sent to the primary Ethernet port 204a or to the configuration Ethernet port 204b.

Furthermore, while in the foregoing embodiments the camera 100 is shown as a bullet camera, in alternative embodiments (not depicted) different types of cameras, such as dome cameras, may be used.

While an SoC is used in the foregoing embodiments, in alternative embodiments (not depicted) the SoC may instead be, for example, a microprocessor, microcontroller, programmable logic controller, field programmable gate array, or an application-specific integrated circuit. Examples of computer readable media are non-transitory and include disc-based media such as CD-ROMs and DVDs, magnetic media such as hard drives and other forms of magnetic disk storage, and semiconductor based media such as flash media, random access memory, and read only memory.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

FIGS. 4(a) and (b) depict a flowchart of an exemplary embodiment of a method. Some of the blocks illustrated in the flowchart may be performed in an order other than that which is described. Also, it should be appreciated that not all of the blocks described in the flowchart are required to be performed, that additional blocks may be added, and that some of the illustrated blocks may be substituted with other blocks.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A security camera having dual communication ports, the camera comprising:
   (a) a camera body mountable to a mounting surface and comprising an aperture to permit light to enter the camera body;
   (b) a lens mounted to the camera body and positioned to refract the light entering the camera body through the aperture;
   (c) an imager located within the camera body and positioned to receive the light refracted by the lens;
   (d) primary communication circuitry comprising a primary communication port accessible from outside the camera body, wherein the primary communication port is on one side of the mounting surface when the camera body is mounted;
   (e) secondary communication circuitry comprising a secondary communication port accessible from outside the camera body, wherein the secondary communication port and the aperture are on an opposing side of the mounting surface when the camera body is mounted; and
   (f) control and processing circuitry communicatively coupled to the imager and to the primary and secondary communication circuitry, the control and processing circuitry comprising a processor and a computer readable medium, communicatively coupled to the processor, having encoded thereon statements and instructions to cause the processor to send a digital communication signal derived from the light incident on the imager to the secondary communication port when the secondary communication port is coupled to an active link.

2. The camera of claim 1 wherein the digital communication signal is simultaneously sent to both the primary and secondary communication ports.

3. The camera of claim 1 wherein the digital communication signal is separately sent to the primary communication port or to the secondary communication port.

4. The camera of claim 1 wherein the statements and instructions further cause the processor to detect whether the secondary communication port is coupled to the active link, and to send the digital communication signal to the secondary communication port only when the secondary communication port is coupled to the active link.

5. The camera of claim 4 wherein detecting whether the secondary communication port is coupled to the active link comprises polling the secondary communication port.

6. The camera of claim 4 wherein the statements and instructions further cause the processor, when the secondary communication port is not coupled to the active link, to send the digital communication signal to the primary communication port.

7. The camera of claim 4 wherein the secondary communication port is located on an underside of the camera body.

8. The camera of claim 4 wherein the digital communication signal is communicated using Ethernet.

9. The camera of claim 4 wherein the control and processing circuitry further comprises a media access controller (MAC) and input/output control circuitry, each of which is communicatively coupled to the processor and to the primary and secondary communication circuitry.

10. The camera of claim 9 wherein the primary communication circuitry comprises a primary PHY communicatively coupled to the primary communication port and to the MAC and the secondary communication circuitry comprises a secondary PHY communicatively coupled to the secondary communication port and to the MAC.

11. The camera of claim 9 wherein the primary and secondary PHYs are communicatively coupled to the MAC through a shared media-independent interface (MII bus) and a shared management data input/out interface (MDIO bus) of the MAC.

12. The camera of claim 11 wherein the primary and secondary PHYs are pin strapped to commence operation by setting their outputs that are connected to the MII bus to a high impedance state.

13. The camera of claim 11 wherein the input/output circuitry comprises a primary reset line communicatively coupled to a reset input of the first PHY, a secondary reset line communicatively coupled to a reset input of the second PHY, and an address line communicatively coupled to an MDIO address select input on the first and second PHYs.

14. The camera of claim 11 wherein the statements and instructions further cause the processor, prior to detecting that the secondary communication port is coupled to the active link, to send the digital communication signal to the primary communication port via the primary PHY and to set outputs of the secondary PHY connected to the MII bus to a high impedance state, and following detecting that the secondary communication port is coupled to the active link:

(a) to stop the primary PHY;
(b) to notify the application layer that there is no active link prior to activating the secondary PHY;
(c) to set outputs of the primary PHY connected to the MII bus to a high impedance state;
(d) to take the outputs of the secondary PHY connected to the MII bus out of a high impedance state;
(e) to activate the secondary PHY; and
(f) to notify the application layer that the active link is present.

15. The camera of claim 1 wherein the camera is a bullet camera.

16. A method for switching between primary and secondary communication ports of a security camera comprising a camera body mountable to a mounting surface, an aperture in the camera body to permit light to enter the camera body, a lens mounted to the camera body and positioned to refract the light entering the camera body through the aperture, and an imager located within the camera body and positioned to receive the light refracted by the lens, wherein the primary communication port is on one side of the mounting surface when the camera body is mounted and the secondary communication port and the aperture are on an opposing side of the mounting surface when the camera body is mounted, the method comprising sending a digital communication signal comprising a video signal derived from the light incident on the imager to the secondary communication port when the secondary communication port is coupled to an active link.

17. The method of claim 16 wherein the digital communication signal is simultaneously sent to both the primary and secondary communication ports.

18. The method of claim 16 wherein the digital communication signal is separately sent to the primary communication port or to the secondary communication port.

19. The method of claim 16 wherein the method further comprises detecting whether the secondary communication port is coupled to the active link, and sending the digital communication signal to the secondary communication port only when the secondary communication port is coupled to the active link.

20. The method of claim 19 wherein detecting whether the secondary communication port is coupled to the active link comprises polling the secondary communication port.

21. The method of claim 19 wherein the method further comprises when the secondary communication port is not coupled to the active link, sending the digital communication signal to the primary communication port.

22. The method of claim 19 wherein the secondary communication port is located on an underside of the camera body.

23. The method of claim 19 wherein the digital communication signal is communicated using Ethernet.

24. The method of claim 19 wherein the camera further comprises a media-independent interface (MII) bus and a primary PHY and a secondary PHY, each of which has outputs connected to the MII bus and via which the digital communication signal is sent to the primary and secondary communication ports, and further comprising:
(a) prior to detecting that the secondary communication port is coupled to the active link, sending the digital communication signal to the primary communication port via the primary PHY and setting the outputs of the secondary PHY connected to the MII bus to a high impedance state; and
(b) following detecting that the secondary communication port is coupled to the active link:

(i) stopping the primary PHY;
(ii) notifying the application layer that there is no active link prior to activating the secondary PHY;
(iii) setting outputs of the primary PHY connected to the MII bus to a high impedance state;
(iv) taking the outputs of the secondary PHY connected to the MII bus out of a high impedance state;
(v) activating the secondary PHY; and
(vi) notifying the application layer that the active link is present.

25. The method of claim 16 wherein the camera is a bullet camera.

26. A non-transitory computer readable medium having encoded thereon statements and instructions to cause a processor to perform a method as claimed in claim 16.

27. A security camera having dual communication ports, the camera comprising:
(a) a camera body comprising an aperture to permit light to enter the camera body;
(b) a lens mounted to the camera body and positioned to refract the light entering the camera body through the aperture;
(c) an imager located within the camera body and positioned to receive the light refracted by the lens;
(d) an attachment assembly attached to the camera body and mountable to a mounting surface;
(e) primary communication circuitry comprising a primary communication port accessible through the attachment assembly;
(f) secondary communication circuitry comprising a secondary communication port accessible through the camera body; and
(g) control and processing circuitry communicatively coupled to the imager and to the primary and secondary communication circuitry, the control and processing circuitry comprising a processor and a computer readable medium, communicatively coupled to the processor, having encoded thereon statements and instructions to cause the processor to send a digital communication signal derived from the light incident on the imager to the secondary communication port when the secondary communication port is coupled to an active link.

28. The camera of claim 27 wherein the attachment assembly comprises a mounting arm affixed to an attachment plate, and wherein the attachment plate comprises an access port through which the primary communication port is accessible.

29. The camera of claim 28 wherein the access port is positioned on a surface of the attachment plate adjacent to the mounting surface when the camera is mounted.

30. The camera of claim 27 wherein the digital communication signal is simultaneously sent to both the primary and secondary communication ports.

31. The camera of claim 27 wherein the digital communication signal is separately sent to the primary communication port or to the secondary communication port.

32. The camera of claim 27 wherein the statements and instructions further cause the processor to detect whether the secondary communication port is coupled to the active link, and to send the digital communication signal to the secondary communication port only when the secondary communication port is coupled to the active link.

33. The camera of claim 32 wherein detecting whether the secondary communication port is coupled to the active link comprises polling the secondary communication port.

34. The camera of claim 32 wherein the statements and instructions further cause the processor, when the secondary communication port is not coupled to the active link, to send the digital communication signal to the primary communication port.

35. The camera of claim 32 wherein the secondary communication port is located on an underside of the camera body.

36. The camera of claim 32 wherein the digital communication signal is communicated using Ethernet.

37. The camera of claim 32 wherein the control and processing circuitry further comprises a media access controller (MAC) and input/output control circuitry, each of which is communicatively coupled to the processor and to the primary and secondary communication circuitry.

38. The camera of claim 37 wherein the primary communication circuitry comprises a primary PHY communicatively coupled to the primary communication port and to the MAC and the secondary communication circuitry comprises a secondary PHY communicatively coupled to the secondary communication port and to the MAC.

39. The camera of claim 38 wherein the primary and secondary PHYs are communicatively coupled to the MAC through a shared media-independent interface (MII bus) and a shared management data input/out interface (MDIO bus) of the MAC.

40. The camera of claim 39 wherein the primary and secondary PHYs are pin strapped to commence operation by setting their outputs that are connected to the MII bus to a high impedance state.

41. The camera of claim 39 wherein the input/output circuitry comprises a primary reset line communicatively coupled to a reset input of the first PHY, a secondary reset line communicatively coupled to a reset input of the second PHY, and an address line communicatively coupled to an MDIO address select input on the first and second PHYs.

42. The camera of claim 39 wherein the statements and instructions further cause the processor, prior to detecting that the secondary communication port is coupled to the active link, to send the digital communication signal to the primary communication port via the primary PHY and to set outputs of the secondary PHY connected to the MII bus to a high impedance state, and following detecting that the secondary communication port is coupled to the active link:
    (a) to stop the primary PHY;
    (b) to notify the application layer that there is no active link prior to activating the secondary PHY;
    (c) to set outputs of the primary PHY connected to the MII bus to a high impedance state;
    (d) to take the outputs of the secondary PHY connected to the MII bus out of a high impedance state;
    (e) to activate the secondary PHY; and
    (f) to notify the application layer that the active link is present.

43. The camera of claim 27 wherein the camera is a bullet camera.

44. A security camera having dual communication ports, the camera comprising:
    (a) a camera body mountable to a mounting surface and comprising an aperture to permit light to enter the camera body;
    (b) a lens mounted to the camera body and positioned to refract the light entering the camera body through the aperture;
    (c) an imager located within the camera body and positioned to receive the light refracted by the lens;
    (d) primary communication circuitry comprising a primary communication port accessible from outside the camera body, wherein the primary communication port is behind the mounting surface when the camera body is mounted;
    (e) secondary communication circuitry comprising a secondary communication port accessible from outside the camera body, wherein the secondary communication port is in front of the mounting surface when the camera body is mounted; and
    (f) control and processing circuitry communicatively coupled to the imager and to the primary and secondary communication circuitry, the control and processing circuitry comprising a processor and a computer readable medium, communicatively coupled to the processor, having encoded thereon statements and instructions to cause the processor to send a digital communication signal derived from the light incident on the imager to the secondary communication port when the secondary communication port is coupled to an active link.

45. The camera of claim 44 wherein the digital communication signal is simultaneously sent to both the primary and secondary communication ports.

46. The camera of claim 44 wherein the digital communication signal is separately sent to the primary communication port or to the secondary communication port.

47. The camera of claim 44 wherein the statements and instructions further cause the processor to detect whether the secondary communication port is coupled to the active link, and to send the digital communication signal to the secondary communication port only when the secondary communication port is coupled to the active link.

48. The camera of claim 47 wherein detecting whether the secondary communication port is coupled to the active link comprises polling the secondary communication port.

49. The camera of claim 47 wherein the statements and instructions further cause the processor, when the secondary communication port is not coupled to the active link, to send the digital communication signal to the primary communication port.

50. The camera of claim 47 wherein the secondary communication port is located on an underside of the camera body.

51. The camera of claim 47 wherein the digital communication signal is communicated using Ethernet.

52. The camera of claim 47 wherein the control and processing circuitry further comprises a media access controller (MAC) and input/output control circuitry, each of which is communicatively coupled to the processor and to the primary and secondary communication circuitry.

53. The camera of claim 52 wherein the primary communication circuitry comprises a primary PHY communicatively coupled to the primary communication port and to the MAC and the secondary communication circuitry comprises a secondary PHY communicatively coupled to the secondary communication port and to the MAC.

54. The camera of claim 53 wherein the primary and secondary PHYs are communicatively coupled to the MAC through a shared media-independent interface (MII bus) and a shared management data input/out interface (MDIO bus) of the MAC.

55. The camera of claim 54 wherein the primary and secondary PHYs are pin strapped to commence operation by setting their outputs that are connected to the MII bus to a high impedance state.

56. The camera of claim 54 wherein the input/output circuitry comprises a primary reset line communicatively coupled to a reset input of the first PHY, a secondary reset line communicatively coupled to a reset input of the second PHY, and an address line communicatively coupled to an MDIO address select input on the first and second PHYs.

57. The camera of claim 54 wherein the statements and instructions further cause the processor, prior to detecting that the secondary communication port is coupled to the active link, to send the digital communication signal to the primary communication port via the primary PHY and to set outputs of the secondary PHY connected to the MII bus to a high impedance state, and following detecting that the secondary communication port is coupled to the active link:
(a) to stop the primary PHY;
(b) to notify the application layer that there is no active link prior to activating the secondary PHY;
(c) to set outputs of the primary PHY connected to the MII bus to a high impedance state;
(d) to take the outputs of the secondary PHY connected to the MII bus out of a high impedance state;
(e) to activate the secondary PHY; and
(f) to notify the application layer that the active link is present.

58. The camera of claim 44 wherein the camera is a bullet camera.

* * * * *